US009983091B2

(12) United States Patent
Franklin et al.

(10) Patent No.: US 9,983,091 B2
(45) Date of Patent: May 29, 2018

(54) SYSTEM AND METHOD FOR IDENTIFYING A LEAK

(71) Applicant: INNOVATIVE PRESSURE TESTING, LLC, Fulshear, TX (US)

(72) Inventors: Charles Mark Franklin, Katy, TX (US); Richard A. Cully, Katy, TX (US)

(73) Assignee: INNOVATIVE PRESSURE TESTING, LLC, Fulshear, TX (US)

( * ) Notice: Subject to any disclaimer, the term of this patent is extended or adjusted under 35 U.S.C. 154(b) by 273 days.

(21) Appl. No.: 15/061,737

(22) Filed: Mar. 4, 2016

(65) Prior Publication Data

US 2017/0254719 A1    Sep. 7, 2017

(51) Int. Cl.
G01M 3/26    (2006.01)

(52) U.S. Cl.
CPC .................................. *G01M 3/26* (2013.01)

(58) Field of Classification Search
CPC ............ G01M 3/00; G01M 3/26; G06F 17/10
See application file for complete search history.

(56) References Cited

U.S. PATENT DOCUMENTS

| | | | | |
|---|---|---|---|---|
| 2,924,965 A * | 2/1960 | Westerheim | .......... | G01L 9/0072 73/40 |
| 4,587,619 A * | 5/1986 | Converse, III | ...... | G01M 3/3263 702/51 |
| 4,625,545 A * | 12/1986 | Holm | .................... | G01M 3/002 374/4 |
| 4,686,851 A * | 8/1987 | Holm | .................. | G01M 3/3263 73/49.2 |
| 5,375,455 A * | 12/1994 | Maresca, Jr. | ....... | G01M 3/2892 73/40.5 R |
| 6,311,548 B1 * | 11/2001 | Breidenbach | ...... | F02M 25/0809 73/114.39 |
| 2003/0171903 A1 | 9/2003 | Rutherford et al. | | |
| 2004/0000187 A1 | 1/2004 | Kobayashi et al. | | |
| 2006/0229776 A1 * | 10/2006 | Lvovich | ............. | G01N 33/2835 324/698 |

(Continued)

FOREIGN PATENT DOCUMENTS

WO    2015/057226 A1    4/2015

OTHER PUBLICATIONS

International Patent Application No. PCT/US2017/020657 International Search Report and Written Opinion dated Jun. 9, 2017 (16 pages).

*Primary Examiner* — Nguyen Ha
(74) *Attorney, Agent, or Firm* — Conley Rose, P.C.

(57) ABSTRACT

A method for identifying a leak in a pressure system. The method includes receiving, from a pressure sensor, pressure data of a fluid contained in the pressure system, determining a slope and curvature of the pressure data, determining a ratio of the curvature to the slope of the pressure data, and monitoring the ratio over a period of time. The method also includes, as a result of a non-constant component of the ratio exceeding a predetermined threshold, generating an indication that a leak may be present in the pressure system, or as a result of the ratio including no non-constant component or a non-constant component below the predetermined threshold, generating an indication that no leak is present in the pressure system.

20 Claims, 4 Drawing Sheets

(56) References Cited

U.S. PATENT DOCUMENTS

| | | | | |
|---|---|---|---|---|
| 2013/0274988 A1* | 10/2013 | Reynes | ............... | B60C 23/0408 701/29.4 |
| 2014/0334946 A1 | 11/2014 | Larvall et al. | | |
| 2015/0128693 A1* | 5/2015 | Franklin | ............. | E21B 47/1025 73/152.51 |
| 2015/0195665 A1 | 7/2015 | Salvia et al. | | |
| 2015/0354346 A1* | 12/2015 | Franklin | ............. | G01M 3/2807 702/51 |
| 2015/0354347 A1* | 12/2015 | Franklin | ................ | G01M 3/28 702/51 |

\* cited by examiner

SYSTEM AND METHOD FOR IDENTIFYING A LEAK

BACKGROUND

Tubes, valves, seals, containers, tanks, receivers, pressure vessels, pipelines, conduits, heat exchangers, and other similar components, are typically configured to retain and/or transport fluids under pressure. These components may be referred to as a pressure system. One example of a pressure system includes a pipeline for transporting natural gas or other hydrocarbons. Another example is a natural gas well, an oil well, or other types of wells, whether being actively drilled or already producing, that typically transports fluids from a producing geological formation to a well head. Wells may include various components, such as a Christmas tree, a well head, production tubing, casing, drill pipe, blowout preventers, completion equipment, coiled tubing, snubbing equipment, and various other components.

The fluids retained or transported within pressure systems typically include one or more gases, liquids, or combinations thereof, including any solid components entrained within the fluid. A typical fluid may comprise crude oil, methane or natural gas, carbon dioxide, hydrogen sulfide, natural gas liquids, water, drilling fluid, and the like. Other examples include hydraulic fluid within a hydraulic line.

Many pressure systems are tested to ensure that the pressure system is not leaking and that the pressure system is capable of maintaining pressure integrity. However, performing such pressure tests often requires a test pressure within the pressure system to be held for a significant period of time until a steady-state test pressure (i.e., one in which the test pressure changes very little with time) is reached. That is, it may be only after a steady-state pressure is reached that an operator might be assured that a decrease in pressure was a result of the fluid cooling via a transfer of heat from the fluid to the sea and/or other surrounding media rather than because of a leak. In addition, tests may be repeated several times to ensure validity of the tests, which results in even more time spent testing. This testing process is costly because the tests could take from 12 to 24 hours or more to complete when, for example, an offshore drilling vessel or rig leases for $800,000 per day or more.

SUMMARY

The problems noted above are solved in large part by a method for identifying a leak in a pressure system. The method includes receiving, from a pressure sensor, pressure data of a fluid contained in the pressure system, determining a slope and curvature of the pressure data, determining a ratio of the curvature to the slope of the pressure data, and monitoring the ratio over a period of time. The method also includes, as a result of a non-constant component of the ratio exceeding a predetermined threshold, generating an indication that a leak may be present in the pressure system, or as a result of the ratio including no non-constant component or a non-constant component below the predetermined threshold, generating an indication that no leak is present in the pressure system.

The problems noted above may be further solved by a system for identifying a leak in a pressure system. The system includes at least one pressure sensor coupled to the pressure system and a processor coupled to the pressure sensor. The processor is configured to receive, from the pressure sensor, pressure data of a fluid contained in the pressure system, determine a slope and curvature of the pressure data, determine a ratio of the curvature to the slope of the pressure data, and monitor the ratio over a period of time. As a result of a non-constant component of the ratio exceeding a predetermined threshold, the processor is configured to cause an output device to indicate that a leak may be present in the pressure system, or as a result of the ratio including no non-constant component or a non-constant component below the predetermined threshold, the processor is configured to cause the output device to indicate that no leak is present in the pressure system.

The problems noted above may still further be solved by a non-transitory computer-readable medium containing instructions that, when executed by a processor, cause the processor to receive pressure data of a fluid contained in the pressure system, determine a slope and curvature of the pressure data, determine a ratio of the curvature to the slope of the pressure data, and monitor the ratio over a period of time. As a result of a non-constant component of the ratio exceeding a predetermined threshold, the processor causes an output device to indicate that a leak may be present in the pressure system, or as a result of the ratio including no non-constant component or a non-constant component below the predetermined threshold, the processor causes the output device to indicate that no leak is present in the pressure system.

BRIEF DESCRIPTION OF THE DRAWINGS

For a detailed description of exemplary embodiments of the disclosure, reference will now be made to the accompanying drawings in which.

NOTATION AND NOMENCLATURE

Figure 1:
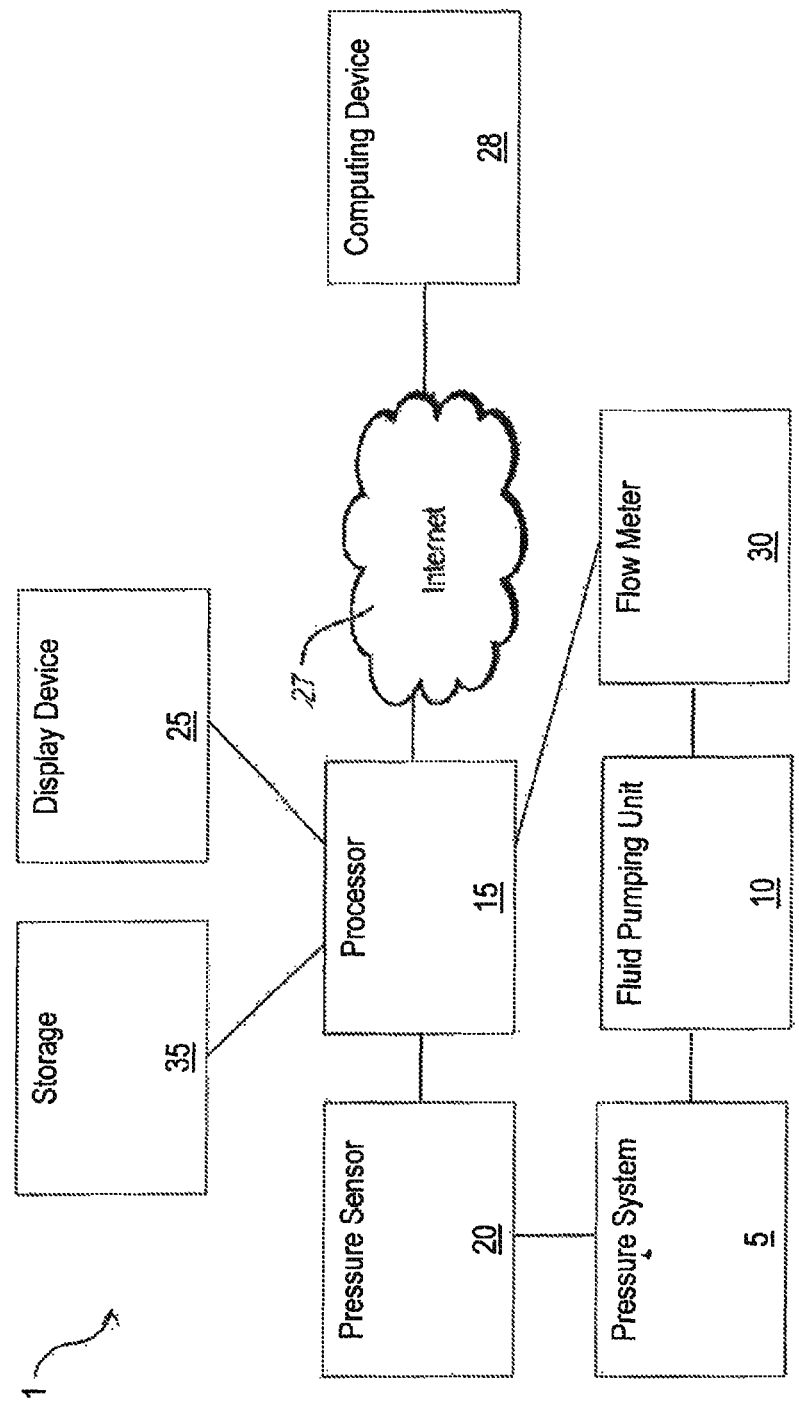
FIG. 1 shows a block diagram of a leak detection system in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. When used in a mechanical context, if a first component couples or is coupled to a second component, the connection between the components may be through a direct engagement of the two components, or through an indirect connection that is accomplished via other intermediate components, devices and/or connections. In addition, when used in an electrical context, if a first device couples to a second device, that connection may be through a direct electrical connection, or through an indirect electrical connection via other devices and connections.

As used herein, the term "state"—as in "passing state" or "failing state"—refers to the state of a computing device when a particular constraint is satisfied. For example, a computing device may be in a passing state when passing constraints are met and may be in a failing state when failing constraints are met. Further, being in a passing state does not necessarily indicate that a test has been passed and being in a failing state does not necessarily indicate that a test has been failed; in some cases, additional constraints must be satisfied in the passing state for the test to be passed and additional constraints must be satisfied in the failing state for the test to be failed.

As used herein, the terms "rate of change," "slope," and "first derivative" all refer to the same characteristic of a value.

As used herein, the terms "curvature" and "second derivative" all refer to the same characteristic of a value.

DETAILED DESCRIPTION

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Embodiments of the present disclosure are directed to detecting and optionally quantifying leaks in a pressure system, such as a pipeline for transporting natural gas or other hydrocarbons or other fluids, blow-out preventers, various wells including casing and other completion components, hydraulic or fuel lines, fluid storage containers, and other types of systems for transporting or retaining fluids. Various leak detection techniques may utilize a pressurization phase in which a fluid contained by the pressure system is increased in pressure (e.g., by pumping additional fluid into the pressure system) and a shut-in phase in which the pressure system is fluidically isolated from the source providing the increase in pressure.

One or more pressure sensors or transducers may be coupled to the pressure system to detect a pressure of the pressure system and generate data indicative of that pressure, which may be used for further analysis of the pressure system and, in particular, to determine whether a leak may be present in the pressure system. However, such pressure analysis to determine whether a leak may be present is often complicated by thermal effects introduced during testing, which can be particularly influential in subsea testing environments. Contributing thermal influences may include heat from pump friction, heat from compression, and movements of fluids through portions of the pressure system having varying temperatures.

Following shut-in, cooling effects (e.g., caused by the temperature differential between the fluid in the pressure system and the environment in which the pressure system exists) contribute to a decay in the pressure of the pressure system, which is observed by the pressure sensors. In the absence of such thermal influences, a pressure decay would typically indicate the presence of a leak in the pressure system. However, due to the real-world nature of such pressure testing in which thermal influences affect the pressure of fluid within the pressure system, it can be difficult to differentiate between a pressure decrease caused by a leak and a pressure decrease caused by thermal influences.

Conventionally, a period of time was allowed to pass until it could be assumed that any thermal influences had stabilized, at which point an indication of continuously declining pressure would indicate that a leak is likely present. Of course, as explained above, particularly in the oil and gas industry, these conventional techniques require a considerable amount of time due to system volumes and testing fluids in use. In addition to the costly amount of downtime necessitated by the conventional testing procedures, components and equipment also may be exposed to high pressures for extended periods of time, which increases the possibility for damage and potential failure as a leak of fluids at high pressures can wash out sealing elements, decreasing their effectiveness as the leak continues. Embodiments of the present disclosure address these and other issues by detecting and evaluating a leak before thermal influences have stabilized.

Turning now to FIG. 1, a block diagram of a leak detection system 1 is shown in accordance with various embodiments of the present disclosure. The leak detection system 1 includes a pressure system 5. The pressure system may include various tubes, valves, seals, containers, vessels, heat exchangers, pumps, pipelines, conduits, and other similar components to retain and/or transport fluids through the pressure system 5. As explained above, examples of the pressure system 5 include a pipeline for transporting natural gas or other hydrocarbons or other fluids, blow-out preventers, various wells including casing and other completion components, hydraulic or fuel lines, fluid storage containers, and other types of systems for transporting or retaining fluids.

The pressure system 5 may contain fluids such as gases, liquids, or combinations thereof, including any solid components entrained within the fluid. Examples of fluids include crude oil, methane, natural gas, carbon dioxide, hydrogen sulfide, natural gas liquids, and the like. Where the pressure system 5 comprises an exploration oil or gas well, the fluids typically include drilling fluids, lost circulation materials, various solids, drilled formation solids, and formation fluids and gases.

The leak detection system 1 may include a fluid pumping unit 10, which may be a cementing unit or a pump. The fluid pumping unit 10 is coupled to the pressure system 5. The fluid pumping unit 10 supplies a selected or particular volume of a test fluid from a source or reservoir of fluid to the pressure system 5. The selected or particular volume may be based on a desired pressure for the pressure system 5; that is, the volume supplied may be chosen such that the pressure system 5 reaches a desired pressure. The test fluid may comprise water, water with additional additives, drilling fluid, completion fluid or a fluid of the type already present in the pressure system 5, or other combinations thereof. The selected volume of test fluid depends, in part, on the size or total volume of the pressure system 5, and can be from small amounts, such as microliters for laboratory equipment, to large amounts, such as barrels and more, for large pressure systems, such as pipelines and oil and gas wells. Adding test fluid to the pressure system 5 raises the pressure at which the fluid within the pressure system 5 is confirmed, such that a test pressure is reached that is greater than the initial pressure of the fluid in the pressure system 5. The pressure system 5 may be shut-in once the pressure system 5 reaches a desired test pressure.

Optionally, a flow meter 30 is coupled to the fluid pumping unit 10 to sense the amount of fluid being added to the pressure system 5. The flow meter 30 may comprise a venturi flow meter, a pressure flow meter, a stroke counter, an impeller flow meter, or other similar flow meters. The flow meter 30 optionally displays a signal that indicates the flow of the fluid, such as a flow rate, via gauges and/or digital displays. The flow meter 30 optionally transmits a signal reflective of the flow rate to a processor 15, for example via sensor cables or wirelessly (e.g., via Internet 27 or another wireless network).

The leak detection system 1 also includes at least one pressure sensor 20 coupled to the pressure system 5. The pressure sensor 20 senses a pressure of the fluid within the pressure system 5 before, during, and after pressurization of the pressure system 5. In some embodiments, the pressure sensor 20 displays a signal that indicates the pressure of the fluid within the pressure system 5, for example via gauges and/or digital displays. The pressure sensor 20 transmits a signal that indicates the pressure to the processor 15, typically via sensor cables, although it is contemplated that the pressure sensor 20 can be configured to transmit the signal wirelessly. The pressure sensor 20 may be selected for the particular operating conditions, such as a pressure and temperature range that is expected for the fluid within the pressure system 5. For example, a pressure sensor 20 selected for use in a pressure system that is part of an oil well, such as a blowout preventer, would be capable of sensing a wide range of pressures at a wide range of temperatures.

The processor 15 may be a component in a variety of computers such as laptop computers, desktop computers, netbook and tablet computers, personal digital assistants, smartphones, and other similar devices and can be located at the testing site or remote from the site. One skilled in the art will appreciate that these computing devices include other elements in addition to the processor 15, such as display device 25, various types of storage, communication hardware, and the like. The processor 15 may be configured to execute particular software programs to aid in the testing of a pressure system 5. The functionality of the processor 15 and these executable programs will be described in further detail below.

As noted above, the processor 15 may couple to a display device 25, in some cases by way of intermediate hardware such as a graphics processing unit or video card. The display device 25 includes devices such as a computer monitor, a television, a smartphone display, or other known display devices.

As explained, in connection with fluids and gases that exhibit a potentially significant change in pressure as a function of the fluid's temperature, it can be difficult to determine whether a change in pressure in a pressure system is merely a result of the change in temperature of the fluid, or if it is a result of a leak somewhere within the pressure system. For example, a fixed volume of a synthetic drilling fluid in a suitable container/pressure vessel used in oil and gas drilling exhibits a decreasing pressure as a function of decreasing temperature. Depending on the drilling fluid involved, the pressure can vary significantly with temperature. In deep water offshore drilling, the drilling fluid may be at a particular temperature at the surface before being pressurized. As the pressure system is pressurized with drilling fluid, the temperature of the drilling fluid rises as a result of its increase in pressure, and thus may exceed the ambient temperature of the fluid when it was at the surface.

The fluid is subsequently cooled as it resides in a wellhead or blow-out preventer that can be several thousand feet below the surface of the ocean and on the sea floor where the ambient water temperature may be as low as 34° F. Thus, there is a large and rapid transfer of heat energy from the drilling fluid, through the containing drill pipe and/or riser, to the surrounding ocean, which, in turn, causes a sometimes significant decrease in the pressure of the fluid held within the pressure system. In accordance with various embodiments of the present disclosure, the pressure response of a pressure system is analyzed to determine the presence of a leak in the pressure system, to optionally quantify the leak rate or severity, and to generally distinguish a drop in pressure caused by thermal influences from one caused by a leak within the pressure system.

It is contemplated that the test pressure data acquired and stored in the computer readable medium optionally undergoes some form of data smoothing or normalizing processes to eliminate spikes or data transients. For example, one may use procedures to perform a moving average, curve fitting, and other such data smoothing techniques. Additionally or alternately, the test pressure data may be filtered using hardware filters, software filters, or a combination thereof.

Figure 2:
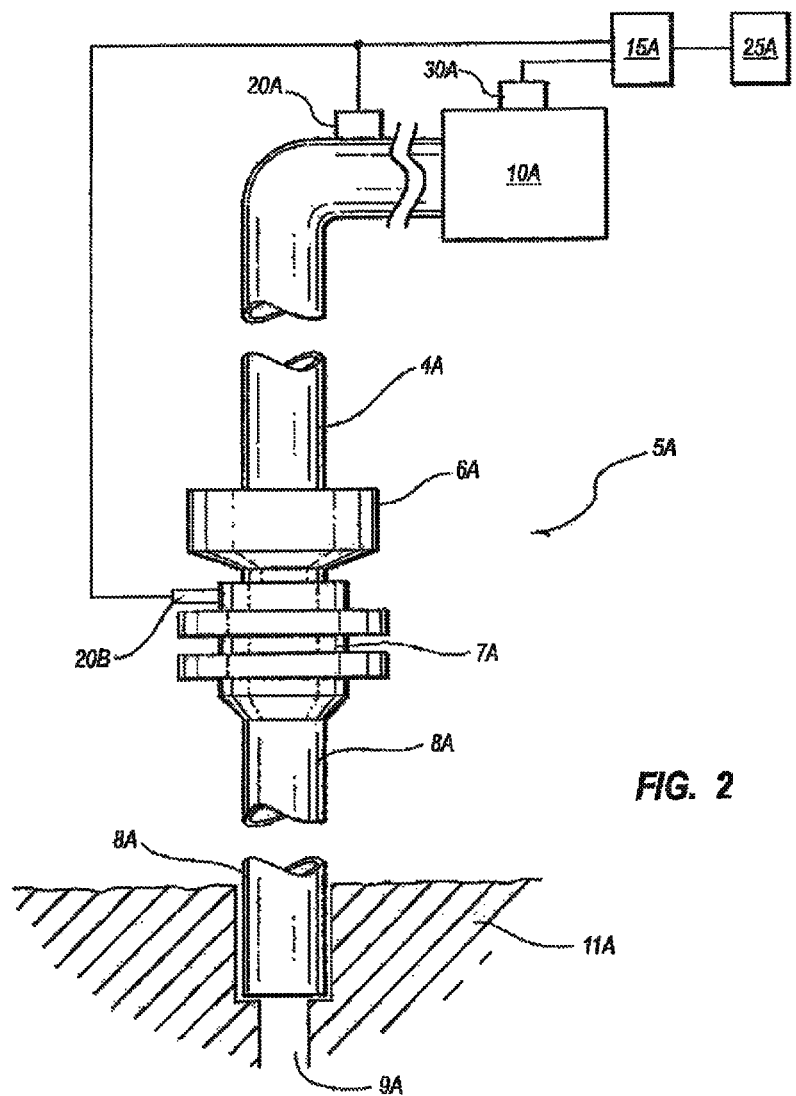
FIG. 2 shows an exemplary leak detection system used to test a blowout preventer on an oil rig in accordance with various embodiments.

FIG. 2 shows an exemplary embodiment of the leak detection system in the context of a deepwater exploration well in which the blowout preventer and, more specifically, various subcomponents of the blowout preventer that can be hydraulically isolated from the other components, are tested for leaks and pressure integrity. The leak detection system of FIG. 2 is associated with a pressure system 5A that includes, in this example, flow line 4A (which may be one or more flow lines) that couple a fluid pumping unit 10A, typically a cementing unit when on a drilling rig, to one or more annular blowout preventers 6A and one or more shear rams and/or pipe rams 7A. Additionally, FIG. 2 also illustrates the casing 8A, open well bore 9A, and the formation or geological structure/rock 11A that surrounds the open well bore 9A. The various embodiments of the present disclosure extend to all such elements for leak detection and pressure integrity testing.

Also illustrated in FIG. 2 is a flow meter or flow sensor 30A coupled to a processor 15A as previously described. Also illustrated are two pressure sensors 20A and 20B coupled to the pressure system 5A, one at the surface and one at the blowout preventer. In certain embodiments, other pressure sensors may be located at the same or different locations of the pressure system 5A. The pressure sensors 20A and 20B shown are coupled to the processor 15A as described above. A display device 25A, comparable to that described above, is also coupled to the processor 15A.

A further application and benefit of the disclosed methods and systems accrue in the particular scenario in which a low pressure test precedes a high pressure test. The ability to detect a leak during the low pressure test, something difficult given the resolution and capability of prior art methods, for example using a circular chart recorder, permits a user of the present disclosure to take remedial action to investigate and/or to stop a leak following a the low pressure test and before preceding to the high pressure test phase. Taking preventive or remedial action at the low pressure test phase reduces risk to equipment that might fail catastrophically under high pressures; reduces risk to personnel that might otherwise be in the area of the equipment or pressure systems during which the pressure systems fail while they undergo a high pressure test; reduces the risk to the environment should the pressure systems otherwise fail while they undergo a high pressure test; and reduces the time to detect the leak because a leak could potentially be discovered at the low pressure stage before undertaking the time and money to conduct a high pressure test.

The above-described thermal influence—a cooling process in the context of pressure testing described herein—can be modeled by an exponential decay function. For example, the pressure is represented as a function of time and given by:

$$P(t)=(P_0-P_f)e^{-ct}+P_f \quad \text{(Equation 1)}$$

In Equation 1, c represents the exponential decay constant of the cooling process, $P_0$ represents the initial pressure of the pressure system at the time of shut-in, and $P_f$ represents the final pressure, which is attained asymptotically as the cooling process is completed. Of course, it should be appreciated that embodiments of the present disclosure do not necessarily require that the various parameter values actually be calculated; rather, and as will be explained in further detail below, Equation 1 represents a modeling of an expected pressure-versus-time curve where thermal change over time is expected. In the example of a subsea hydrocarbon well, this thermal change is a function of the pressure system holding a fluid having an increased temperature (e.g., due to pressurization) where an ambient temperature surrounding the pressure system is different and, in this particular example, much lower.

Leveraging Equation 1, embodiments of the present disclosure determine slope and curvature data or functions of the measured pressure data by determining first and second derivatives of the pressure equation. For example, the slope or first derivative of the pressure data is given by:

$$P'(t)=-c(P_0-P_f)e^{-ct} \quad \text{(Equation 2)}$$

Similarly, the curvature or second derivative of the pressure data is given by:

$$P''(t)=c^2(P_0-P_f)e^{-ct} \quad \text{(Equation 3)}$$

Although Equations 2 and 3 represent the mathematical derivatives of Equation 1, it should be appreciated that in practice, it is not strictly necessary to calculate the literal derivative of a pressure-versus-time curve. For example, a certain amount of pressure data (e.g., 120 seconds worth of data) may be captured and buffered, at which point a linear regression or other slope-based analysis is performed in order to determine a slope (which, in some cases, may comprise a derivative operation) of the pressure data over that time period. Similarly, another linear regression or other slope-based analysis may then be performed on the result, which determines a curvature (which, in some cases, may comprise a second derivative operation) of the pressure data over that time period. These functions over time may then be leveraged as explained below.

Since Equation 1 assumes that the pressure decay is a function of thermal influences (i.e., a leak is not present in the pressure system), the ratio of the curvature (Equation 3) to the slope (Equation 2) of the pressure data is thus equal to the decay constant (−c) of the cooling process:

$$\frac{P''}{P'}=\frac{c^2(P_0-P_f)e^{-ct}}{-c(P_0-P_f)e^{-ct}}=-c \quad \text{(Equation 4)}$$

In accordance with embodiments of the present disclosure, if it is determined that the ratio given by Equation 4 includes non-constant components (e.g., a linear component), then it is likely that a leak may be present in the pressure system. In fact, Equation 1 may be modified to model pressure response when a leak, in this case represented as a linear decay, is present:

$$P_{leak}(t)=(P_0-P_f)(e^{-ct}-at)+P_f \quad \text{(Equation 5)}$$

In Equation 5, a represents the linear leak rate. Similar to Equation 1, derivatives of Pleak(t) are computed as follows:

$$P'_{leak}(t)=(P_0-P_f)(-ce^{-ct}-a) \quad \text{(Equation 6)}$$

$$P''_{leak}(t)=c^2(P_0-P_f)e^{-ct} \quad \text{(Equation 7)}$$

Thus, in scenarios in which a leak is present in the pressure system, the ratio of the curvature (Equation 7) to the slope (Equation 6) of the pressure data is non-constant:

$$\frac{P''_{leak}}{P'_{leak}}=\frac{-c^2}{c+ae^{ct}} \quad \text{(Equation 8)}$$

In embodiments of the present disclosure, pressure data of a pressure system is monitored to determine a slope and curvature of the data, the ratio of which should be relatively constant over time in scenarios in which a leak is not present, as demonstrated above. However, if a non-constant component is present in the ratio between curvature and slope data, then it is likely that a leak is present, as demonstrated above. Of course, due to inherent imperfections and noise in real-world monitoring, a predetermined threshold may be applied such that a non-constant component below the predetermined threshold may still result in a determination is not present or is below an acceptable minimum value; on the other hand, if the non-constant component exceeds the predetermined threshold, then it may be determined that a leak is likely present due to the magnitude of the non-constant component. Still, in certain cases the predetermined threshold may be zero, such that the existence of any non-constant component results in a determination that a leak is likely present.

Figure 3A:
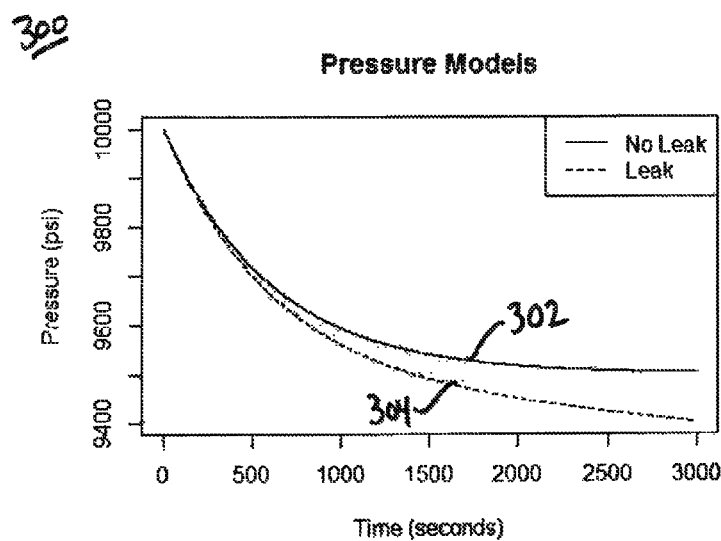
FIGS. 3a and 3b show exemplary plots of pressure and differential ratios of pressure versus time for a pressure system in accordance with various embodiments.

FIG. 3a shows a plot 300 of pressure as a function of time for a pressure system both where no leak is present (302) and where a leak is present (304). As can be seen, while the no leak plot 302 begins to slow its decay and approach an asymptotic pressure value (i.e., once a thermal equilibrium has been reached), the leak plot 304 continues to decay in a generally linear behavior. This linear decay is a result of the thermal equilibrium being reached, and thus the exponential component of the pressure model being minimal, while a linear leak component remains.

Figure 3B:
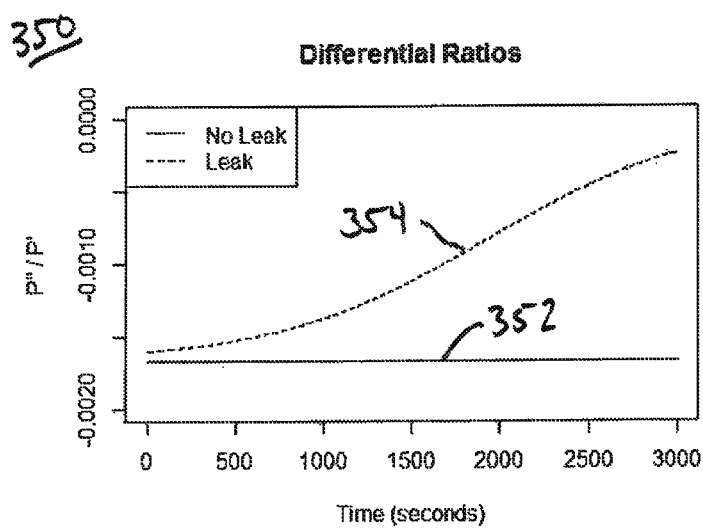

FIG. 3b shows a plot 350 of the differential ratios described above for the same data that generated the plots in FIG. 3a. As can be seen, the no leak plot 352 of the differential ratio remains relatively constant over time. On the other hand, the leak plot 354 of the differential ratio is non-constant. The leak plot 354 reaches a maximum rate of change at a point midway through the exponential decay shown in FIG. 3a, or approximately 1500 seconds in this illustration. As such, detection of a leak at or before this point, based on the differential ratio being non-constant, is both feasible and apparent compared to leak detection methods that rely solely on rate of change or shape of the base pressure curve at or prior to this point.

Embodiments of the present disclosure thus provide a distinct advantage over conventional detection methods, for example those using regression or curve fitting to make a determination as to whether a leak is present. These conventional methods require curve and leak component assumptions, iterative processing with limits of refinement, and ultimately a low-confidence fit during early stages of analysis. By contrast, embodiments of the present disclosure allow for high-confidence early detection, as such assumptions are not required.

Figure 4:
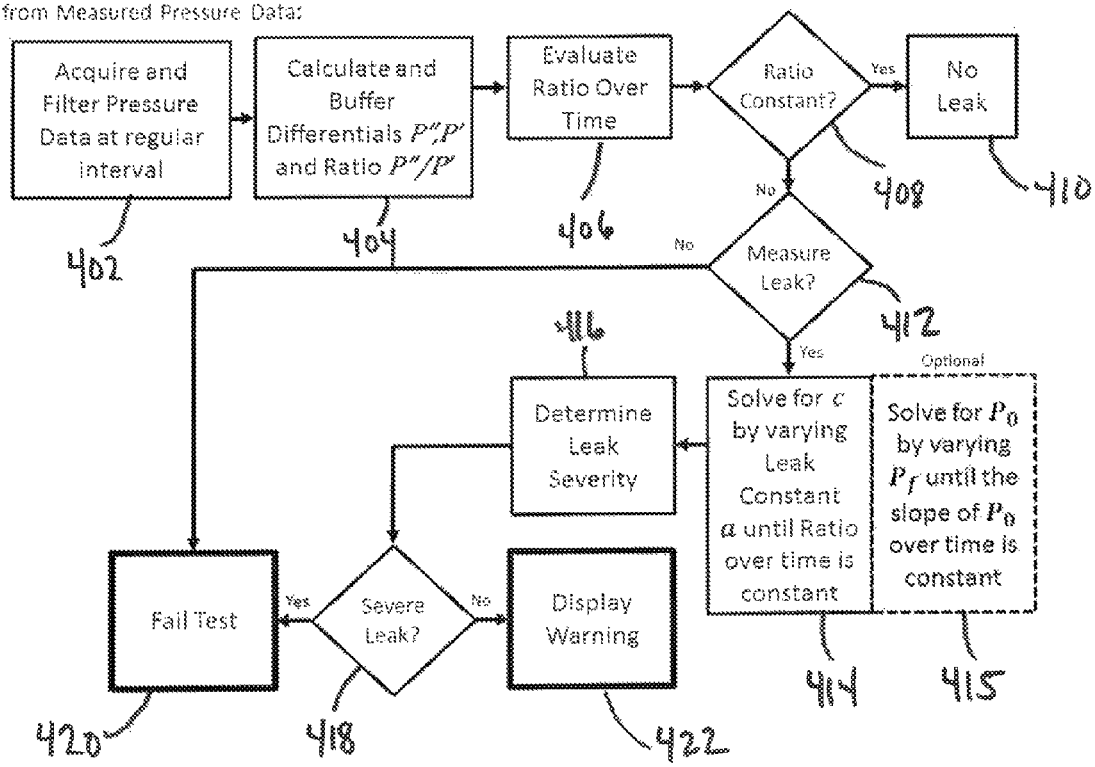
FIG. 4 shows a flow chart of a method for identifying a leak in a pressure system in accordance with various embodiments.

Turning now to FIG. 4, a method 400 for identifying a leak in a pressure system 5 is shown in accordance with various embodiments. The method 400 begins in block 402 with when pressure data is acquired and optionally filtered. In many industries, such as validating equipment and barriers in gas and oil drilling and exploration activities, pressure is measured using pressure sensors that react to pressure by varying a signal (e.g., current or voltage) proportionally to pressure acting against the sensor. The rate of acquisition will typically be one sample per second, which is adequate for detection and measurement of pressure changes over time in large volume tests; however, the rate of acquisition may vary as well. The signal may be converted into a numeric value representing a common unit, such as PSI, through analog to digital conversion.

In real-world scenarios, the pressure data may contain relatively high frequency noise, which can be pre-processed through a filter to remove or reduce this noise, which may be advantageous when using the pressure data to determine if ratios of differential pressure (or the pressures themselves) are remaining within a predetermined threshold. These filters may be rectangular, triangular, Gaussian or pseudo-Gaussian, or others, as appropriate for the type of noise to be mitigated. Filtering of pressure data may be carried out by one or more hardware filters, software filters, or combinations thereof.

The method 400 then continues in block 404 with calculating slope and curvature of the pressure data acquired in block 402, as well as calculating the ratio between the slope and curvature. One of ordinary skill will appreciate that the ratio need not be of curvature to slope and could, in fact, be the opposite ratio. Regardless of the ordering of the calculated ratio, in the absence of a leak the ratio will be nearly constant. Thus, the method 400 also includes buffering the determined ratio and evaluating the ratio over time in block 406.

In particular, in order to determine the slope and curvature of the pressure data, or the first and second derivatives of that data, analysis of the pressure data change over time is beneficial, and thus some amount of pre-determined buffering is required. By buffering data at regular time intervals, the first derivative may be determined using the pressure data to approximate the slope of the tangent line at various points in time. Various methods of determining slope may be utilized, such as measuring the point by point change in pressure and dividing by the time interval, by determining the average change in pressure over a corresponding time interval, or by determining the slope of a line fit to a certain width of data points. Techniques using a width of time larger than the interval value may apply the slope value to the center of an odd number of points to "center" the value to best determine the slope at specific points.

Similarly, in order to determine curvature or the second derivative of the pressure data, the above-described techniques may be employed against the first derivative data rather than the base pressure data itself. In this way, P', P''' and the ratio of P'''/P' can be determined and stored at the interval following an amount of time to build buffers of at least the differential measurement widths applied.

Once a number of differential determinations have been made in block 406, analysis is applied to determine if the ratio is changing over time (i.e., is non-constant). The slope of the differential ratio over time may be ascertained to determine whether the ratio is sufficiently constant over time.

If the ratio stays constant or near-constant (e.g., allowing for real-world variations within a predetermined range) as determined in block 408, the method continues in block 410 with determining that a leak is not present in the pressure system. This result may be displayed on a user device, transmitted across a network to a monitoring center, or otherwise utilized to control the pressure system. For example, if it is determined that a leak is not present and thus the test is complete, the method 400 may also include controlling one or more elements of the pressure system such as valves, pumps, and the like.

However, if the ratio is non-constant, or contains a non-constant (e.g., linear) component exceeding a certain predetermined threshold in block 408, the method 400 continues in block 412 with optionally measuring the leak. If the particular use case does not call for the leak to be measured in block 412, the method 400 continues in block 420 with determining that the test has failed due to the presence of a leak in the pressure system. As above, this result may be displayed on a user device, transmitted across a network to a monitoring center, or otherwise utilized to control the pressure system. For example, if it is determined that a leak is present, the method 400 may also include controlling one or more elements of the pressure system such as valves, pumps, and the like to prevent further leakage, or to otherwise end the test.

If the particular use case calls for the leak to be measured in block 412, the method 400 continues in block 414 with determining a leak constant a that results in a differential ratio over time that is constant. In particular, embodiments of the present disclosure may create a modified pressure response by varying the leak constant a (for example in Equation 5) until the ratio of P'''/P' is essentially constant, or has a slope of essentially zero. The resulting value a will represent the leak component and will have a unit of pressure over time (e.g., psi per minute). The magnitude of the leak component a may be used to determine a severity of the leak by comparison with a predetermined threshold value. Additionally, it may be beneficial to understand the exponential and apparent thermal decay constant –c, and this is determined as presented in Equation 4 as the constant value of the ratio P'''/P'. For example, in some cases a particular range or threshold may exist for the thermal decay constant such that out-of-range values or those that exceed the threshold may indicate an improper volume (e.g., caused by a mis-alignment of valves of the pressure system) or unexpected change in fluid type or temperature.

The method 400 may optionally continue in block 415 with determining other constants of Equation 5. In particular, in the potential interest of determining the remaining constants of Equation 5, $P_0$ (initial pressure) and $P_f$ (final pressure), $P_f$ can be varied until the slope of $P_0$ over time is constant. For example, it may be beneficial to determine a potential final pressure to ensure that a pressure test satisfies a particular minimum test pressure value.

Regardless, the method 400 continues in block 416 with determining a leak severity based at least in part on the determined leak constant from block 414. An apparent leak rate may be determined based on the leak constant and a volume of the system. The detected leaks or leak rates may be displayed in near real time following sufficient buffering periods to determine slope and curvature of the acquired pressure data.

If it is determined in block 418 that the leak is within acceptable limits (i.e., has a leak severity below a predetermined threshold), the method 400 may continue in block 422 with displaying an indication that a leak is present but tolerable. For example, in subsea BOP testing, it is often considered acceptable to have a leak rate of less than 3 psi/min; thus, a leak severity below 3 psi/min would be tolerable. However, if the leak is not within acceptable limits (i.e., has a leak severity above the predetermined threshold), the method 400 may continue in block 420 with communicating such severity to the user and failing the pressure test. It should be appreciated that the thresholds of severity may be predetermined based on regulatory guidelines, experimentally derived, or otherwise calculated severity thresholds. In the case where the test is failed, the method 400 may include taking corrective action such as automating one or more components of the pressure system to return to a safe state and prevent unnecessary damage to components.

Referring briefly back to FIG. 1, the processor 15 is configured to execute instructions read from a computer readable medium, and may be a general-purpose processor, digital signal processor, microcontroller, etc. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems. The program/data storage 35 is a computer-readable medium coupled to and accessible to the processor 15. The storage 35 may include volatile and/or non-volatile semiconductor memory (e.g., flash memory or static or dynamic random access memory), or other appropriate storage media now known or later developed. Various programs executable by the processor 15, and data structures manipulatable by the processor 15 may be stored in the storage 30. In accordance with various embodiment, the program(s) stored in the storage 30, when executed by the processor 15, may cause the processor 15 to carry out any of the methods described herein.

The above discussion is meant to be illustrative of the principles and various embodiments of the present disclosure. Numerous variations and modifications will become apparent to those skilled in the art once the above disclosure is fully appreciated. For example, while the embodiments are discussed relating to pressure data from a blowout preventer on a drilling rig, it is understood that embodiments of the presently disclosed system and method of detecting leaks may be applied to pressure systems and fluid systems of other types, as disclosed and discussed above. It is intended that the following claims be interpreted to embrace all such variations and modifications.

What is claimed is:

1. A method for identifying a leak in a pressure system, the method comprising:
   receiving, from a pressure sensor, pressure data of a fluid contained in the pressure system;
   determining a slope and curvature of the pressure data;
   determining a ratio of the curvature to the slope of the pressure data; and
   monitoring the ratio over a period of time and, as a result of a non-constant component of the ratio exceeding a predetermined threshold, generating an indication that a leak may be present in the pressure system; or
   as a result of the ratio including no non-constant component or a non-constant component below the predetermined threshold, generating an indication that no leak is present in the pressure system.

2. The method of claim 1 further comprising determining a leak severity component based on a magnitude of the non-constant component of the ratio and a volume of the pressure system.

3. The method of claim 2 further comprising:
   generating an indication of a failed pressure test as a result of the leak severity component exceeding a predetermined threshold; and
   generating a warning of a leak in the pressure system below an acceptable leak value as a result of the leak severity component being below a predetermined threshold.

4. The method of claim 1 further comprising determining a leak severity component based on a magnitude of the non-constant component of the ratio of the curvature to the slope.

5. The method of claim 4 wherein the leak severity component is a linear component.

6. The method of claim 4 further comprising generating an indication of the leak severity component.

7. The method of claim 1 further comprising pressurizing the pressure system to a test pressure, shutting in the pressure system upon reaching the test pressure, and waiting a predetermined time period prior to determining the ratio of the curvature to the slope of the pressure data of the pressure data.

8. The method of claim 1 further comprising filtering the pressure data prior to determining the slope and curvature of the pressure data.

9. A system for identifying a leak in a pressure system, the system comprising:
   at least one pressure sensor coupled to the pressure system; and
   a processor coupled to the pressure sensor, the processor configured to:
      receive, from the pressure sensor, pressure data of a fluid contained in the pressure system;
      determine a slope and curvature of the pressure data;
      determine a ratio of the curvature to the slope of the pressure data; and
      monitor the ratio over a period of time and, as a result of a non-constant component of the ratio exceeding a predetermined threshold, cause an output device to indicate that a leak may be present in the pressure system; or
      as a result of the ratio including no non-constant component or a non-constant component below the predetermined threshold, cause the output device to indicate that no leak is present in the pressure system.

10. The system of claim 9 wherein the processor is further configured to determine a leak severity component based on a magnitude of the non-constant component of the ratio and a volume of the pressure system.

11. The system of claim 10 wherein the processor is further configured to:
   cause the output device to generate an indication of a failed pressure test as a result of the leak severity component exceeding a predetermined threshold; and
   cause the output device to generate a warning of a leak in the pressure system below an acceptable leak value as a result of the leak severity component being below a predetermined threshold.

12. The system of claim 9 wherein the processor is further configured to determine a leak severity component based on a magnitude of the non-constant component of the ratio of the curvature to the slope.

13. The system of claim 12 wherein the leak severity component is a linear component.

14. The system of claim 12 wherein the processor is further configured to cause the output device to generate an indication of the leak severity component.

15. The system of claim 9 wherein the processor is further configured to wait a predetermined time period prior to determining the ratio of the curvature to the slope of the pressure data of the pressure data.

16. The method of claim 9 further comprising a hardware filter or a software filter executed by the processor configured to filter the pressure data prior to the processor determining the slope and curvature of the pressure data.

17. A non-transitory computer-readable medium containing instructions that, when executed by a processor, cause the processor to:

receive, from a pressure sensor, pressure data of a fluid contained in the pressure system;

determine a slope and curvature of the pressure data;

determine a ratio of the curvature to the slope of the pressure data; and monitor the ratio over a period of time and, as a result of a non-constant component of the ratio exceeding a predetermined threshold, cause an output device to indicate that a leak may be present in the pressure system; or as a result of the ratio including no non-constant component or a non-constant component below the predetermined threshold, cause the output device to indicate that no leak is present in the pressure system.

18. The non-transitory computer-readable medium of claim 17 wherein the instructions, when executed, further cause the processor to determine a leak severity component based on a magnitude of the non-constant component of the ratio and a volume of the pressure system.

19. The non-transitory computer-readable medium of claim 18 wherein the instructions, when executed, further cause the processor to:

cause the output device to generate an indication of a failed pressure test as a result of the leak severity component exceeding a predetermined threshold; and cause the output device to generate a warning of a leak in the pressure system below an acceptable leak value as a result of the leak severity component being below a predetermined threshold.

20. The non-transitory computer-readable medium of claim 17 wherein the instructions, when executed, further cause the processor to determine a leak severity component based on a magnitude of the non-constant component of the ratio of the curvature to the slope.

* * * * *